Sept. 18, 1945.  B. M. HAMMOND  2,385,274
FISH HOOK
Filed June 18, 1943
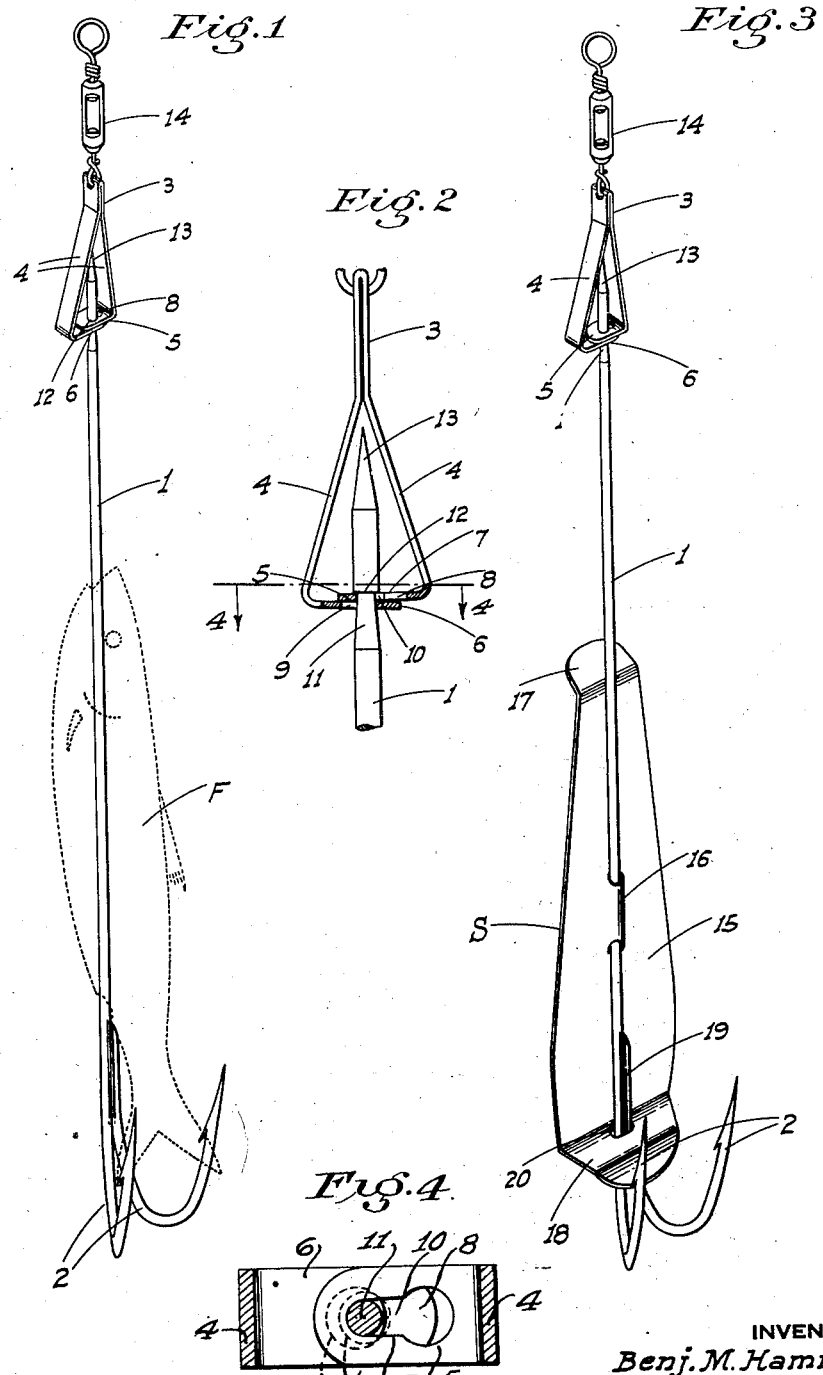
INVENTOR
Benj. M. Hammond
BY
ATTORNEYS Patented Sept. 18, 1945

2,385,274

UNITED STATES PATENT OFFICE 2,385,274

FISHHOOK

Benjamin M. Hammond, Colusa, Calif.

Application June 18, 1943, Serial No. 491,314

4 Claims. (Cl. 43—28)

This invention relates to, and an object thereof is to provide, an improved fish hook unit; the unit being especially designed for commercial fishermen.

A further object of this invention is to provide an improved fish hook unit which comprises, in combination, a hook having a relatively rigid shank, and a quick releasable snap yoke of novel construction attached to the rear end of said shank whereby to permit of ready detachment of the shank from the snap yoke for placement of bait or a spoon on said shank.

A further object of this invention is to provide a fish hook unit as above in which the hook shank is straight and elongated, whereby the same is adapted for reception, selectively, of fresh bait, as for example a fresh sardine, or a metallic spoon, whichever the fisherman may desire to use.

An additional object of the invention is to provide a spoon of novel design and one especially adapted for use with the herein described hook unit.

A further object of the invention is to provide a hook unit which is easy to manipulate, strong, simple and inexpensive, and yet one which is exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a perspective view of the hook unit as ready for use and as baited with a fresh sardine.

Figure 2 is an enlarged fragmentary elevation, partly in section, showing the snap yoke as attached to the rear end portion of the hook shank.

Figure 3 is a perspective view of the hook unit as ready for use and as fitted with my improved spoon.

Figure 4 is an enlarged fragmentary sectional plan on line 4—4 of Fig. 2.

Referring now more particularly to the characters of reference on the drawing, the fish hook unit comprises an elongated hook shank 1 which is straight, relatively small in diameter and preferably formed from a length of spring steel rod. At its forward end the shank 1 is formed with a pair of divergent prongs or hooks 2.

At its inner end the hook shank is quick-releasably connected with a snap yoke, indicated generally at 3, said yoke being preferably made of spring brass and comprising the following:

A pair of straight spring legs 4 are connected together at their rear ends, and from said connected ends the legs diverge forwardly for some distance. The forward ends of said legs are turned toward each other and form lapped feet, indicated at 5 and 6.

The foot 5 is formed with a keyhole slot 7 extending lengthwise of the foot and with its enlarged opening 8 of a diameter no less than the maximum diameter of the rear end portion of hook shank 1. A circular opening 9, corresponding to the enlarged opening 8 of the keyhole slot 7, is formed in the foot 6 in normally offset relation to said enlarged opening 8; the restricted but elongated opening or portion 10 of the keyhole slot being smaller transversely than the diameter of the shank 1 and projecting from the enlarged opening 8 in the direction of the opening 9 in foot 5.

Adjacent its rear end the hook shank 1 is reduced in diameter by tapering as at 11, whereby to form a forwardly facing shoulder 12; the reduced portion of the shank being of a diameter adjacent said shoulder to fit into restricted opening 10 of the keyhole slot.

It will be seen that when the spring legs 4 are pressed toward each other until openings 8 and 9 in feet 5 and 6, respectively, come into register, the rear end portion of shank 1 may be projected through said registering openings to an extent that the shoulder 12 is disposed rearwardly of foot 5. Thereupon the legs 4 are permitted to spring apart, which forces the tapered or reduced diameter portion 11 of the shank 1 into the restricted opening 10 of keyhole slot 7. The shoulder 12 then rides against the foot 5 and cannot escape from the snap yoke; while the tendency of the legs 4 to spring outwardly maintains the parts against accidental separation. The rear end of shank 1 is pointed as at 13, and when the snap yoke is in place said point is protected thereby.

A swivel 14 of conventional type is connected at one end with the rear end of the snap yoke and is adapted at its other end for connection with the fishing line.

In use of the above described hook unit with bait, the fisherman removes the snap yoke 3 from the shank 1 and then threads said shank through the bait, here shown as a fresh sardine F. The snap yoke is then reattached to the shank in the manner previously described and the baited hook unit is ready for use.

When the hook unit is used with a spoon, the spoon is attached as shown in Fig. 3, and which spoon is of the following novel construction:

The spoon S comprises a flat, elongated blade 15, preferably of brilliant metal, and tapering slightly in a rearward direction. Intermediate its ends and centrally between its side edges the blade is formed with a longitudinal sleeve 16 offset from the top face of said blade and through which sleeve the shank 1 engages with a close frictional fit. At its rear end the blade 15 is formed with a rounded and outturned lip 17, while at its forward end the blade is formed with a rounded and inturned lip 18. The prongs or hooks 2 at the point of their juncture with the shank 1 form a shank portion 19 which is transversely enlarged or elongated, and this portion projects through a generally matching slot 20 in the inturned lip 18 through which the shank projects. By reason of this shank and slot arrangement the spoon S cannot rotate about the shank 1, and always remains in the same relative position as shown in Fig. 3.

When the hook unit is used with the spoon, the spoon rides in the water and oscillates back and forth laterally, but does not rotate; the lip 18 and the hooks 2 always remaining in upwardly projecting relation to the blade 15.

When it is desired to remove the spoon S from the shank 1 for any reason, as for example the replacement of a new spoon, or a piece of fresh bait in substitution for the spoon, the snap yoke 3 is removed and the shank withdrawn from the lip 18 and sleeve 16.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A fish-hook unit comprising, in combination, a hook having a rod-like shank, and a snap yoke quick-detachably connected with the rear end portion of said shank; the shank including an annular groove therein adjacent its rear end, and said snap yoke including opposed spring legs having quick releasable holding elements, each engaged under tension in said groove from the side opposite the corresponding leg.

2. A fish hook unit comprising, in combination, a hook having a rod-like shank, said shank having a groove therein adjacent its rear end, and a snap yoke quick-detachably connected with the rear end portion of said shank; said yoke being generally triangular in configuration, one end of said yoke including a spring-pressed element having an opening through which said rear end portion of the shank projects, whereby said element may engage in said groove.

3. A fish hook unit comprising, in combination, a hook having a rod-like shank, said shank having a groove therein adjacent its rear end, and a snap yoke quick-detachably connected with the rear end portion of said shank; said yoke comprising a pair of spring legs connected together at their rear end and diverging forwardly, inturned lapping feet on the forward ends of said legs, said feet having openings positioned to be brought into register only upon movement of said legs toward each other, and the rear end portion of the shank being adapted to project through said openings when in register whereby when the legs are released, portions of said feet engage in said groove and releasably secure the shank to the yoke.

4. A fish hook unit as in claim 3 in which the opening in the innermost foot is a keyhole slot with the reduced portion thereof extending toward the opening in the other foot, and the groove in the shank forms a forwardly facing shoulder whereby the grooved portion of the shank engages in said reduced portion of the keyhole slot and said shoulder seats on the adjacent portion of the corresponding foot when said legs are released.

BENJAMIN M. HAMMOND.